(12) United States Patent
Yang

(10) Patent No.: US 9,439,251 B2
(45) Date of Patent: Sep. 6, 2016

(54) OFFSET VOLTAGE ELIMINATING CIRCUIT STRUCTURE FOR PROTECTION MECHANISM OF DIMMER

(71) Applicant: Sen-Tai Yang, New Taipei (TW)

(72) Inventor: Sen-Tai Yang, New Taipei (TW)

(73) Assignee: YUJING TECHNOLOGY CO., LTD., New Taipei (TW)

(*) Notice: Subject to any disclaimer, the term of this patent is extended or adjusted under 35 U.S.C. 154(b) by 15 days.

(21) Appl. No.: 14/555,648

(22) Filed: Nov. 27, 2014

(65) Prior Publication Data

US 2016/0157305 A1 Jun. 2, 2016

(51) Int. Cl.
*H05B 33/08* (2006.01)
*H02M 3/155* (2006.01)

(52) U.S. Cl.
CPC .......... *H05B 33/0809* (2013.01); *H02M 3/155* (2013.01); *H05B 33/0845* (2013.01)

(58) Field of Classification Search
CPC .......... H05B 33/0809; H05B 33/0845; H02M 3/155
See application file for complete search history.

(56) References Cited

U.S. PATENT DOCUMENTS

| 7,915,883 B2* | 3/2011 | Chida | G05F 1/563 315/307 |
| 8,275,012 B2* | 9/2012 | Dean | G11B 7/126 372/38.02 |
| 8,699,534 B2* | 4/2014 | Dean | G11B 7/00456 369/116 |
| 2006/0255838 A1* | 11/2006 | Bergmann | H05B 33/0812 327/66 |
| 2011/0215726 A1* | 9/2011 | Liu | H05B 33/0818 315/210 |

* cited by examiner

*Primary Examiner* — Jue Zhang
(74) *Attorney, Agent, or Firm* — Pro-TECHTOR International Services; Ian Oglesby

(57) ABSTRACT

An offset voltage eliminating circuit structure for a protection mechanism of a dimmer is described. The circuit includes a constant current source, a subtractor and a hysteresis comparator. The constant current source is used for outputting a stable current, the output of the constant current source is connected with a dimming signal input through a current-limiting resistor, and the dimming signal input is connected with an output of an external traditional dimmer.

4 Claims, 8 Drawing Sheets

OFFSET VOLTAGE ELIMINATING CIRCUIT STRUCTURE FOR PROTECTION MECHANISM OF DIMMER

BACKGROUND OF THE INVENTION

1. Field of the Invention

The invention relates to an offset voltage eliminating circuit structure for a protection mechanism of a dimmer, and more particularly, to a circuit that provides a current output when connected to an external resistive dimmer and eliminates the offset voltage created by an external limiting resistor used for circuit protection.

2. Description of the Prior Art

LEDs are widely used in various lighting conditions due to their characteristics such as low energy consumption and long life. However, there are considerable differences in the physical characteristics between LEDs and traditional light elements, such that a dimmer circuit suitable for a traditional light element may not be used directly to control the brightness of a LED. As such, one possible approach is to connect a converting circuit between the LED and the traditional dimmer circuit in order to turn the control mechanism of the traditional dimmer circuit into a control voltage for controlling the LED.

Traditional light dimmers can generally be classified as voltage, resistive and PWM types. Regardless of which type it is, an analog dimming signal from 0 to 10V is usually output. This voltage represents brightness from 0% to 100%. The above converting circuit must be able to accept the analog dimming signal (0 to 10V) output by the traditional dimmer and convert it into a control signal that is variable between 0% and 100% in order to drive an appended power supply to provide different voltages to the LED, thus allowing the LED to have different brightness.

As shown in FIG. 1, a converting circuit that can be connected with a traditional dimmer is shown. The converting circuit mainly includes: a constant current source A and a hysteresis comparator CMP1, wherein the constant current source A is formed of a cascaded current mirror circuit consisting of symmetric P-type transistors MP1, MP2, MP3 and MP4 and an N-type transistor MN1, a first operational amplifier OPA1 and a first resistor R1. A voltage V1 can be input into the non-inverting input of the first operational amplifier OPA1. The inverting input of the first operational amplifier OPA1 is connected to the gate of the N-type transistor MN1 and grounded via the first resistor R1. The source of the P-type transistor MP4 is connected to an output Pout. The output Pout is also connected to a dimming signal input ADJ_in.

The non-inverting input of the hysteresis comparator CMP1 is connected to the output Pout (i.e. the dimming signal input ADJ_in), while the inverting input is input with a saw-tooth wave.

Referring to FIG. 2, when the above circuit is in actual use, if the dimming signal input ADJ_in is connected with an output of a traditional resistive dimmer (which can be regarded as a variable resistor RT), then the constant current source A is controlled to output a current I=V1/R1. The current flows through the variable resistor RT to create a voltage VT=RT*V1/R1. This voltage VT can be varied by adjusting the resistance of the variable resistor RT, and it can be input to the hysteresis comparator CMP1 through the output Pout. The hysteresis comparator CMP1 then compares it with the saw-tooth wave to output a GD pulse for adjusting the brightness of the LED. The amount of duty cycle of the GD pulse is proportional to VT.

Referring now to FIG. 3, when the above circuit is in actual use, if the dimming signal input ADJ_in is connected with an output of a traditional voltage-type dimmer (which can be regarded as a DC voltage VA), then the DC voltage VA can be input into the hysteresis comparator CMP1 via the output Pout. The hysteresis comparator CMP1 then compares the DC voltage VA with the saw-tooth wave and outputs a GD pulse for adjusting the brightness of the LED.

Referring now to FIG. 4, when the above circuit is in actual use, if the dimming signal input ADJ_in is connected with an output of a traditional PWM-type dimmer, then a resistor Rf can be provided between the dimming signal input ADJ_in and the output Pout, and the output Pout is further connected to ground via a capacitor C, thus forming a RC oscillating circuit using the resistor Rf and the capacitor C. The PWM signal creates an effective DC voltage VA1 on the output Pout through the discharging of the capacitor C. The voltage VA1 can be input into the hysteresis comparator CMP1 via the output Pout. The hysteresis comparator CMP1 then compares the DC voltage VA with the saw-tooth wave and outputs a GD pulse for adjusting the brightness of the LED.

However, in actual practice, a current-limiting resistor is provided on the dimming signal input ADJ_in to protect the constant current source A and associated circuits from damages caused by high voltage or reversed voltage polarities. Therefore, under normal use (this is especially the case for resistive dimmers, in which the control voltage is formed across a variable resistor RT by outputting a current from the constant current source A), any current that flows through the current-limiting resistor will inevitably create a voltage drop. When this voltage drop of the current-limiting resistor is added with the analog dimming signal input by the dimming signal input ADJ_in, it will cause a voltage offset on the analog dimming signal. This voltage offset will then affect the dimming control voltage output by the hysteresis comparator CMP1, so it must be eliminated in order to obtain the required analog dimming signal input.

In view of the shortcomings in the conventional converting circuit when in use, the present invention is proposed to provide improvements that address these shortcomings.

SUMMARY OF THE INVENTION

One main objective of the present invention is to provide an offset voltage eliminating circuit structure for a protection mechanism of a dimmer, wherein a subtractor is provided for eliminating the voltage offset created by an additional current-limiting resistor used for circuit protection to obtain the correct dimming signal voltage.

Another objective of the present invention is to provide an offset voltage eliminating circuit structure for a protection mechanism of a dimmer, the main circuits of the structure can be packaged into a single integrated circuit, allowing more freedom and independence when being used, and reducing the overall size and improving space utilization.

The accomplishment of these and other objectives of the invention will become apparent from the following description and its accompanying drawings of which:

DETAILED DESCRIPTION OF THE PREFERRED EMBODIMENT

Figure 1:
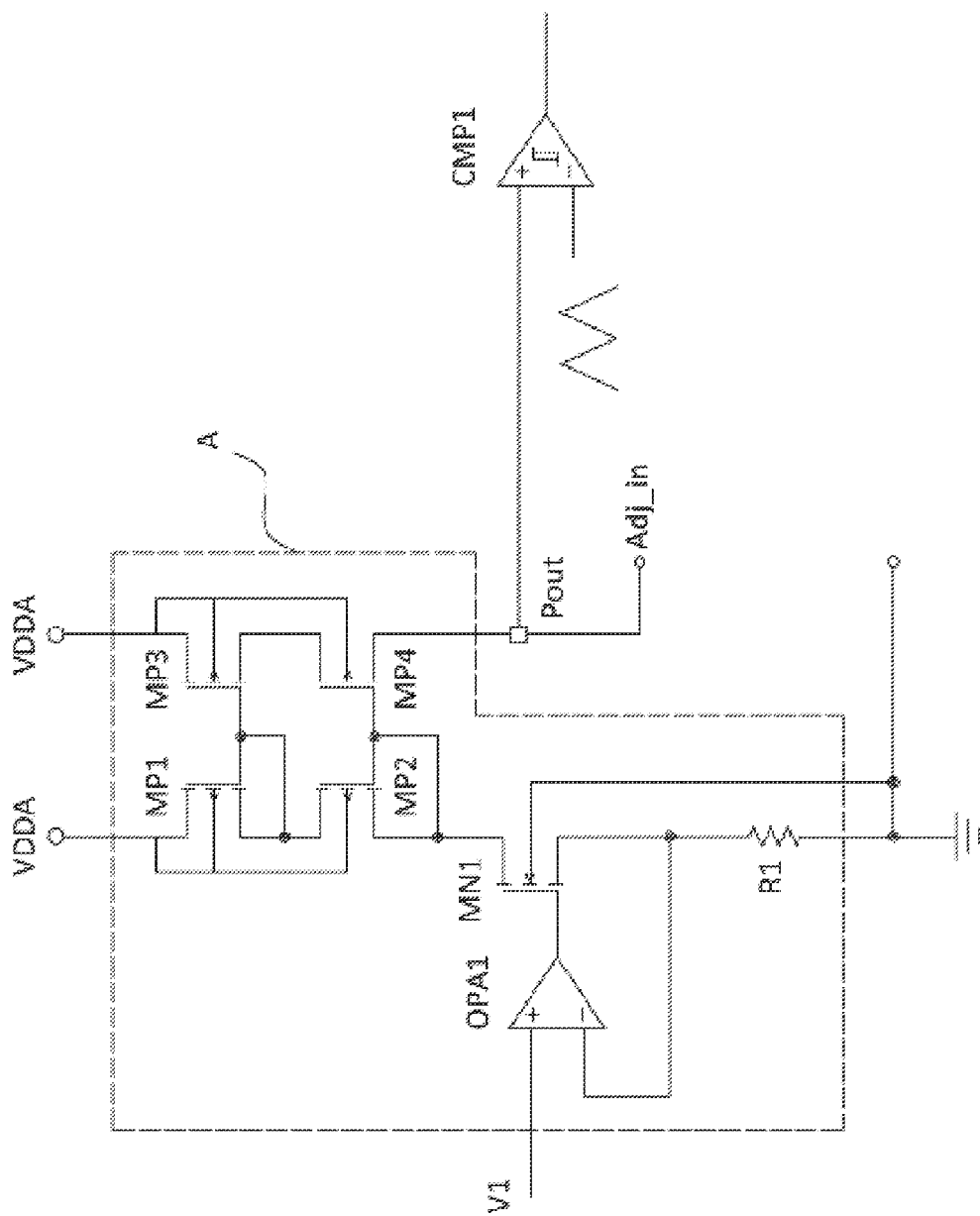
FIG. 1 is a circuit diagram illustrating a LED converting circuit that can be connected with a traditional dimmer.
Figure 2:
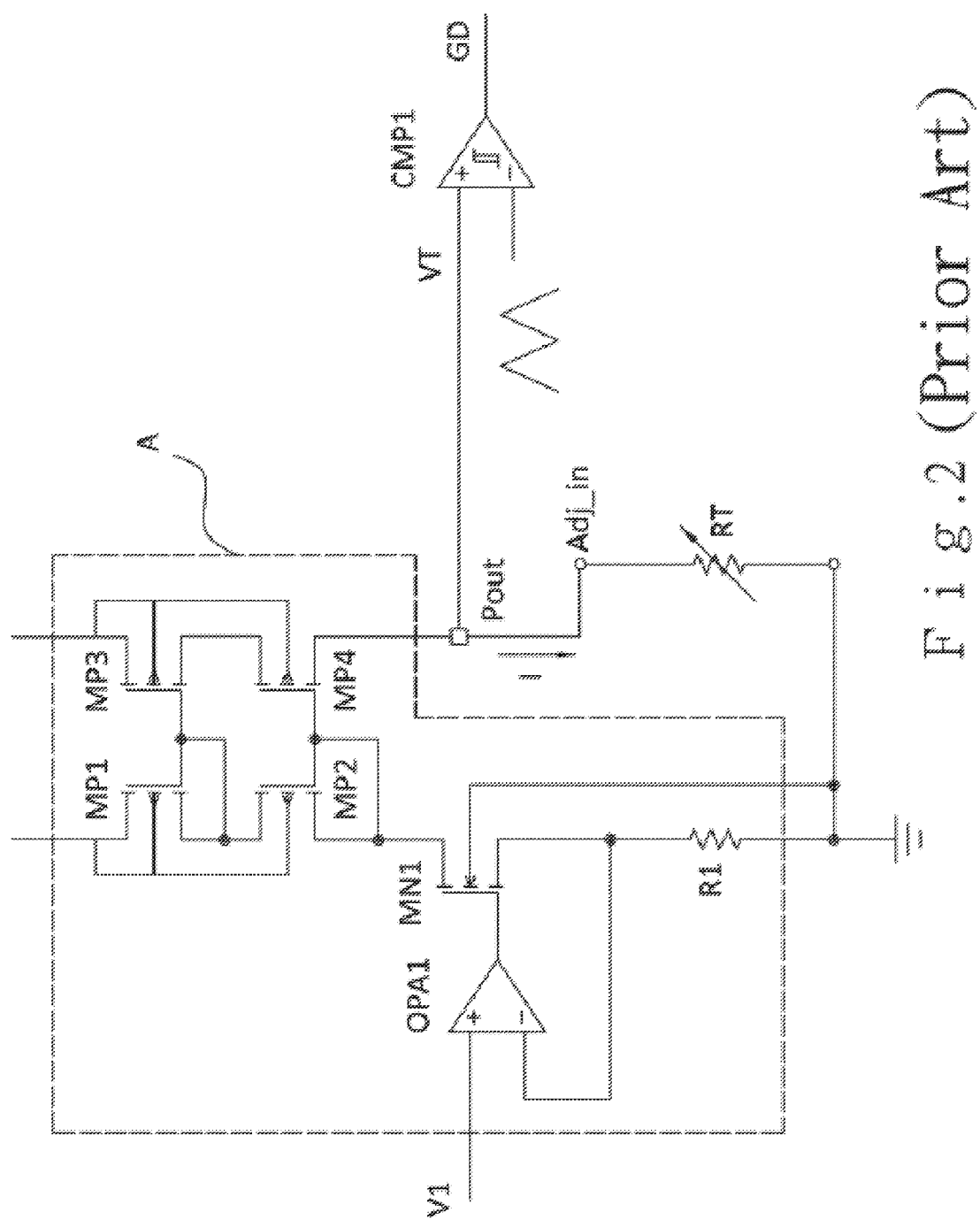
FIG. 2 is a main circuit diagram illustrating the converting circuit of FIG. 1 connected with a traditional resistive dimmer.
Figure 3:
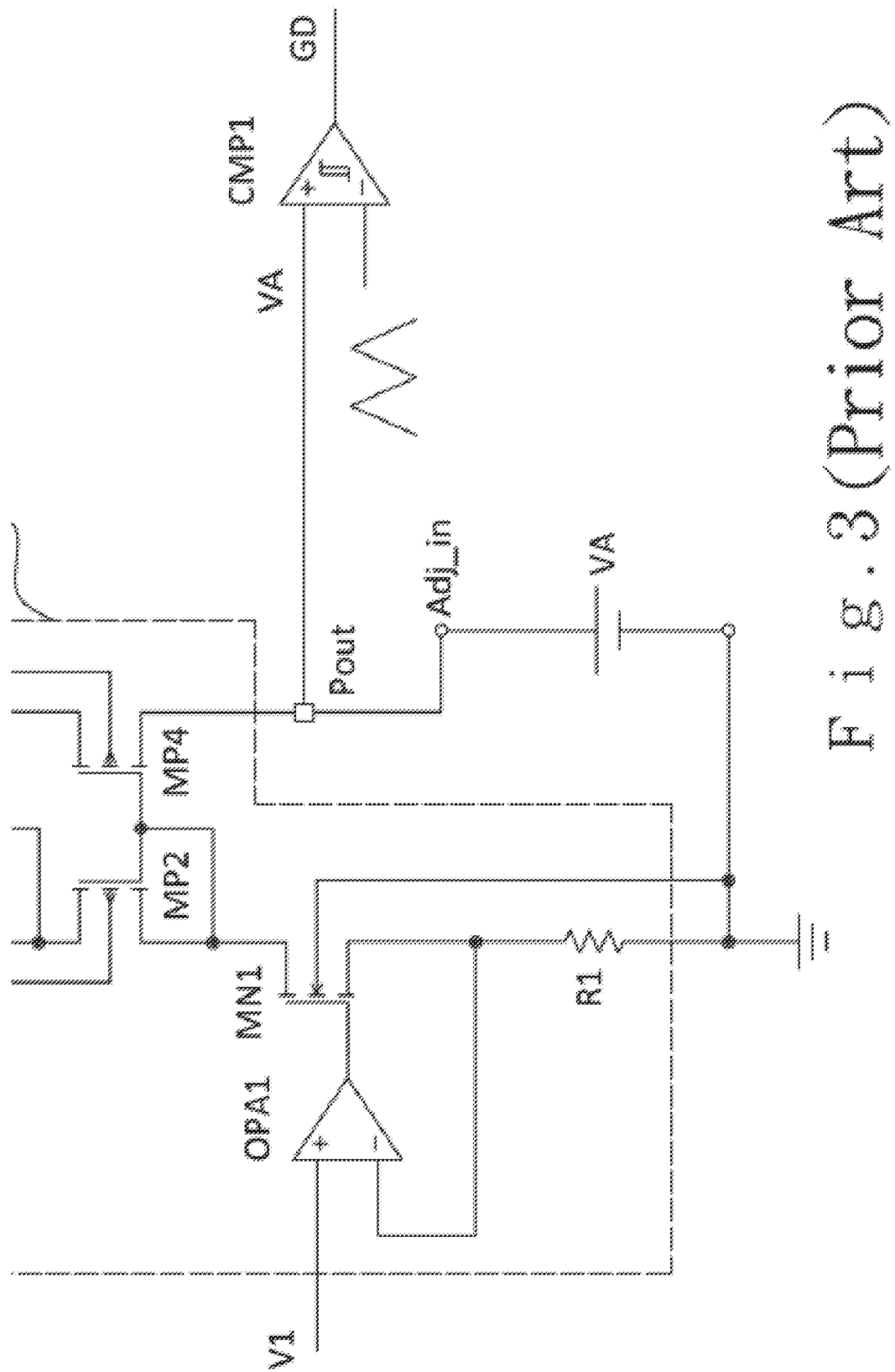
FIG. 3 is a main circuit diagram illustrating the converting circuit of FIG. 1 connected with a traditional voltage-type dimmer.
Figure 4:
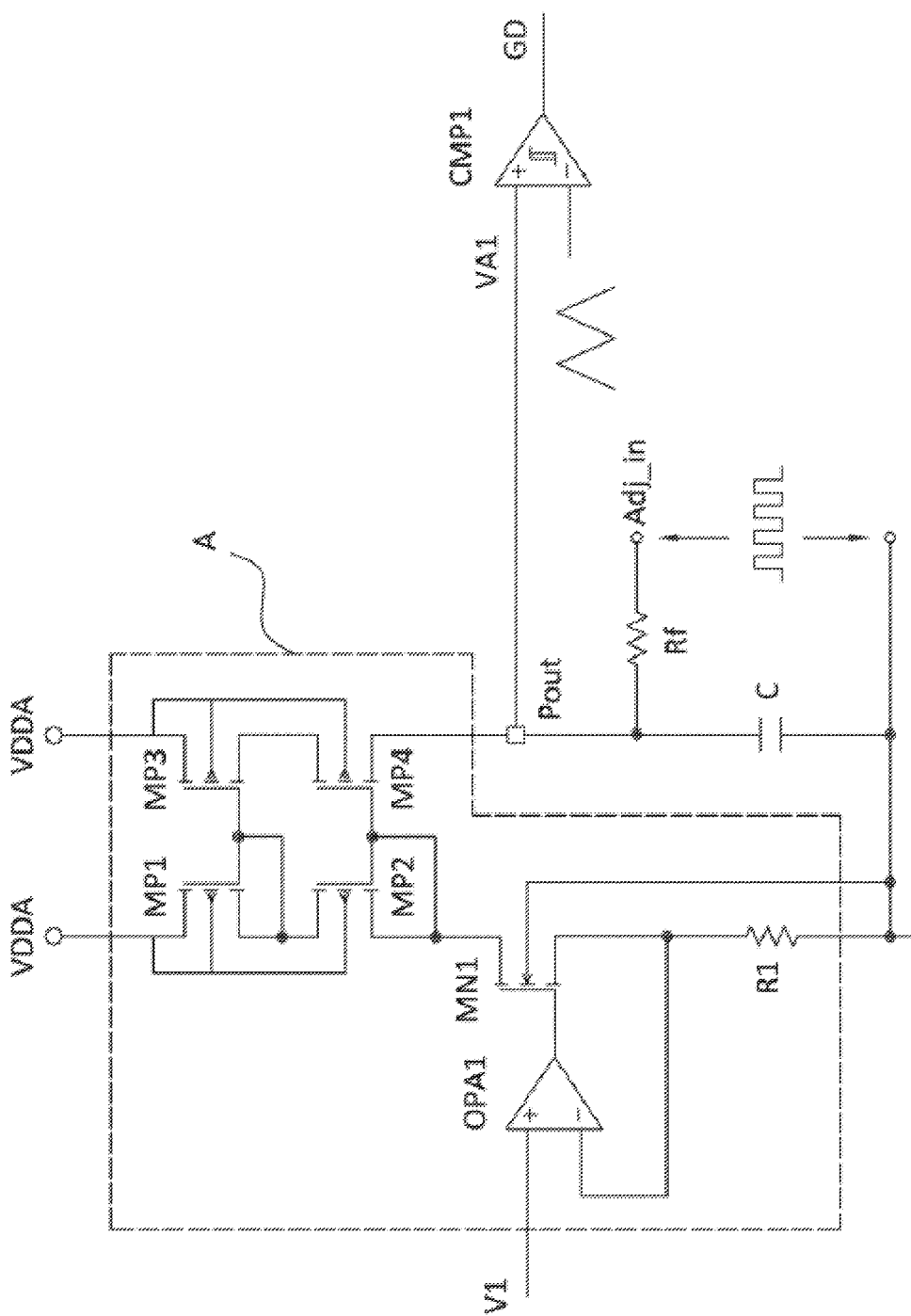
FIG. 4 is a main circuit diagram illustrating the converting circuit of FIG. 1 connected with a traditional PWM-type dimmer.
Figure 5:
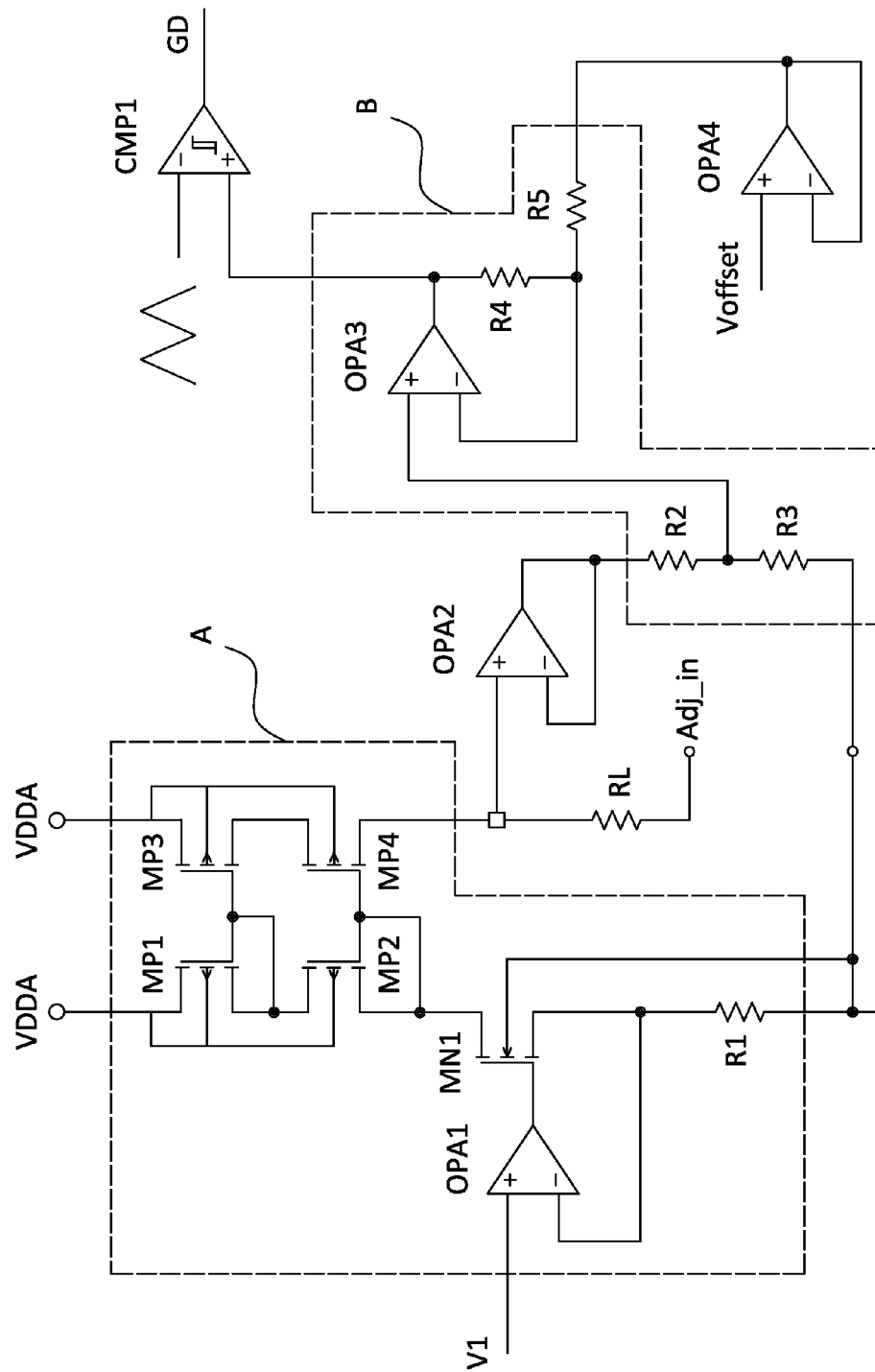
FIG. 5 is a main circuit diagram of an offset voltage eliminating circuit in accordance with the present invention.

Referring to FIG. 5, a circuit structure in accordance with the present invention mainly includes: a constant current source A, a subtractor B and a hysteresis comparator CMP1. The constant current source A is formed of a cascaded current mirror circuit consisting of symmetric P-type transistors MP1, MP2, MP3 and MP4 and an N-type transistor MN1, a first operational amplifier OPA1 and a first resistor R1. A voltage V1 can be input into the non-inverting input of the first operational amplifier OPA1. The inverting input of the first operational amplifier OPA1 is connected to the gate of the N-type transistor MN1 and grounded via the first resistor R1. The source of the P-type transistor MP4 is connected to an output Pout. The output Pout is also connected to a dimming signal input ADJ_in.

The subtractor B is formed of a third operational amplifier OPA3 and second, third, fourth and fifth resistors R2, R3, R4 and R5 that have the same resistances. The second and the third resistors R2 and R3 are connected in series, and the non-inverting input of the third operational amplifier OPA3 is connected between the second and the third resistors R2 and R3. The other end of the second resistor R2 is connected with the output Pout, and the other end of the third resistor R3 is connected to ground. The fourth and the fifth resistors R4 and R5 are connected in series, and the inverting input of the third operational amplifier OPA3 is connected between the fourth and the fifth resistors R4 and R5. The other end of the fourth resistor R4 is connected between the output and the inverting input of the third operational amplifier OPA3, and the other end of the fifth resistor R5 is input with an offset reference voltage Voffset.

In one implementation, one end of the fifth resistor R5 away from the fourth resistor R4 can be connected to a fourth operational amplifier OPA4 depending on the needs. The non-inverting input of the fourth operational amplifier OPA4 is input with the offset reference voltage Voffset, and the output and the inverting input of the fourth operational amplifier OPA4 are both connected to the fifth resistor R5. Furthermore, a second operational amplifier OPA2 is provided between the output Pout of the constant current source A and the second resistor R2 of the subtractor B. The non-inverting input of the second operational amplifier OPA2 is connected with the output Pout of the constant current source A, and the inverting input of the second operational amplifier OPA2 is connected with both the output of the second operational amplifier OPA2 and the second resistor R2.

The hysteresis comparator CMP1 has a non-inverting input and an inverting input. The non-inverting input is connected to the output of the third operational amplifier OPA3, while the inverting input is input with a saw-tooth wave. The hysteresis comparator CMP1 also has an output.

Figure 6:
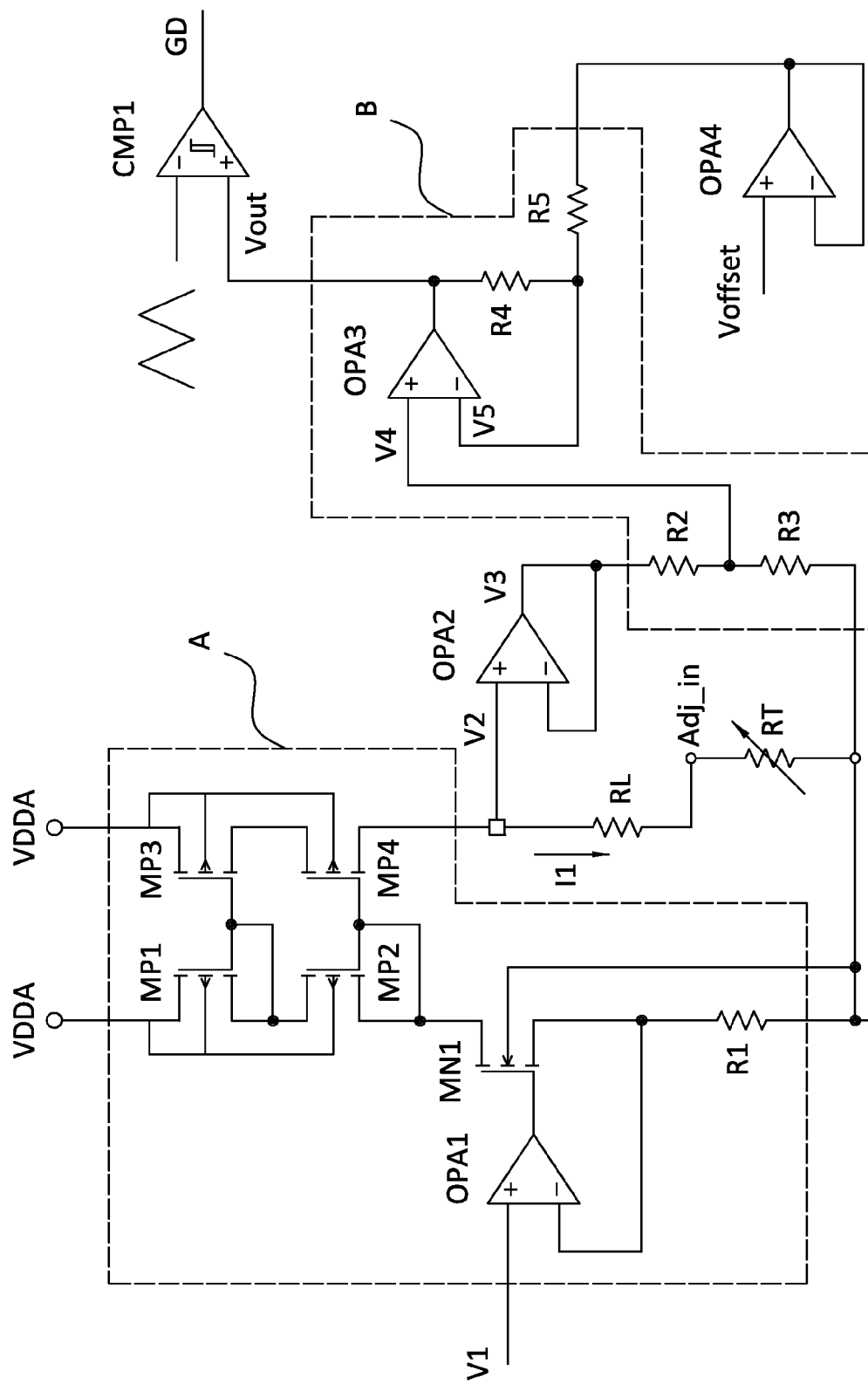
FIG. 6 is a main circuit diagram of the offset voltage eliminating circuit in accordance with the present invention connected with a traditional resistive dimmer.

Referring to FIG. 6, when the embodiment of the present invention is connected with a traditional resistive dimmer, the dimming signal input ADJ_in can be regarded as connected with a variable resistor RT, then the constant current source A is controlled to output a constant current I1 (the current I1 is constant and not adjustable, but can be set through the resistor R1). When the current I1 flows through the current-limiting resistor RL and the variable resistor RT, a voltage is created across the current-limiting resistor (VL=I1*RL), and a voltage is created across the variable resistor (VT1=I1*RT) (the voltage VT1 can be changed by adjusting the variable resistor RT). Thus, the voltage at the output Pout is V2=VL+VT1, wherein the dimming signal voltage actually required is the voltage of the variable resistor VT1, whereas the voltage of the current-limiting resistor is an offset voltage.

Assuming the voltage V2 is input into the buffering second operational amplifier OPA2, and from which a voltage V3 is output (V2=V3); the fourth operational amplifier OPA4 outputs the offset reference voltage Voffset; and the inverting and non-inverting inputs of the third operational amplifier OPA3 in the subtractor B are input with a voltage V5 and a voltage V4, respectively, and the output of the third operational amplifier OPA3 has an output voltage Vout, then Vout=[(1+R4/R5)*V4]−(R4/R5)*Voffset=2V4−Voffset, and V4=[R3/(R2+R3)]*V3=0.5*V3, so Vout=V3−Voffset. Furthermore, V2=V3=VL+VT1, so Vout=VL+VT1−Voffset. If Voffset=VL, then Vout=VT1.

Therefore, if the non-inverting input of the fourth operational amplifier OPA4 is input with an offset reference voltage Voffset that is equal to the voltage of the current-limiting resistor VL (i.e. I1*RL) in magnitude, then the offset voltage can be eliminated (since the current I1 and the current-limiting resistor RL are known, obtaining the value of the voltage of the current-limiting resistor VL is straightforward), such that the final output voltage Vout will be equal to the dimming signal voltage VT1 input by the dimming signal input ADJ_in. Thereafter, the output voltage Vout can be input the hysteresis comparator CMP1. The hysteresis comparator CMP1 compares the output voltage Vout with the saw-tooth wave to output a GD pulse for adjusting the brightness of the LED. The amount of duty cycle of the GD pulse is proportional to VT.

Figure 7:
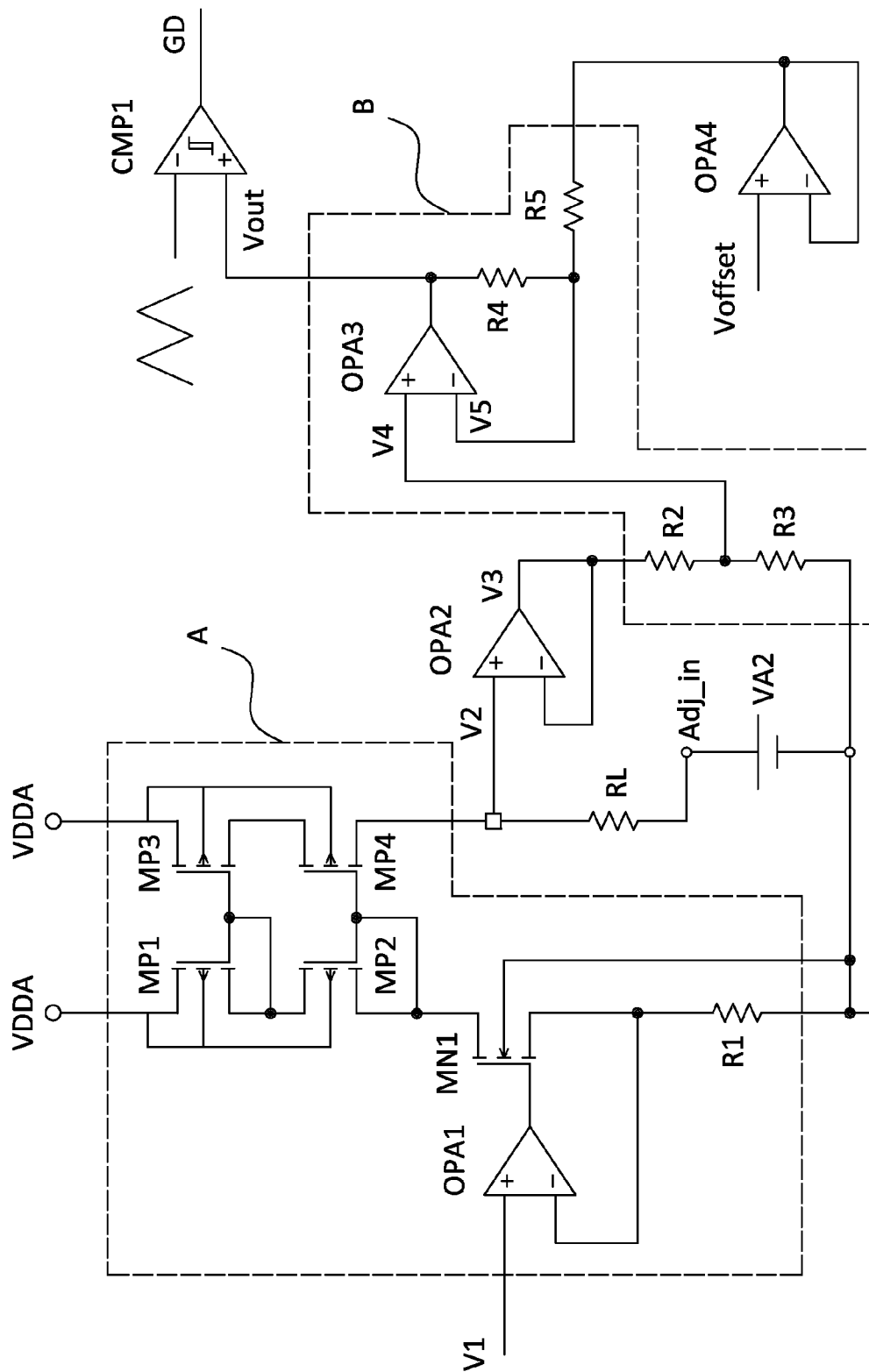
FIG. 7 is a main circuit diagram of the offset voltage eliminating circuit in accordance with the present invention connected with a traditional voltage-type dimmer.

Referring to FIG. 7, when the embodiment of the present invention is connected with a traditional voltage-type dimmer, the dimming signal input ADJ_in can be regarded as connected with a DC voltage VA2. When the circuit is conducting, a current flows through the current-limiting resistor RL to create a voltage across the current-limiting resistor VL1. This voltage VL1 is the offset voltage.

Similarly, if the non-inverting input of the fourth operational amplifier OPA4 is input with an offset reference voltage Voffset that is equal to the voltage of the current-limiting resistor VL1 in magnitude, then the offset voltage (that is, the voltage of the current-limiting resistor VL1) can be eliminated, such that the final output voltage Vout will be equal to the dimming signal voltage VA2 input by the dimming signal input ADJ_in. Thereafter, the output voltage Vout can be input the hysteresis comparator CMP1. The hysteresis comparator CMP1 compares the output voltage Vout with the saw-tooth wave to output a GD pulse for adjusting the brightness of the LED.

Figure 8:
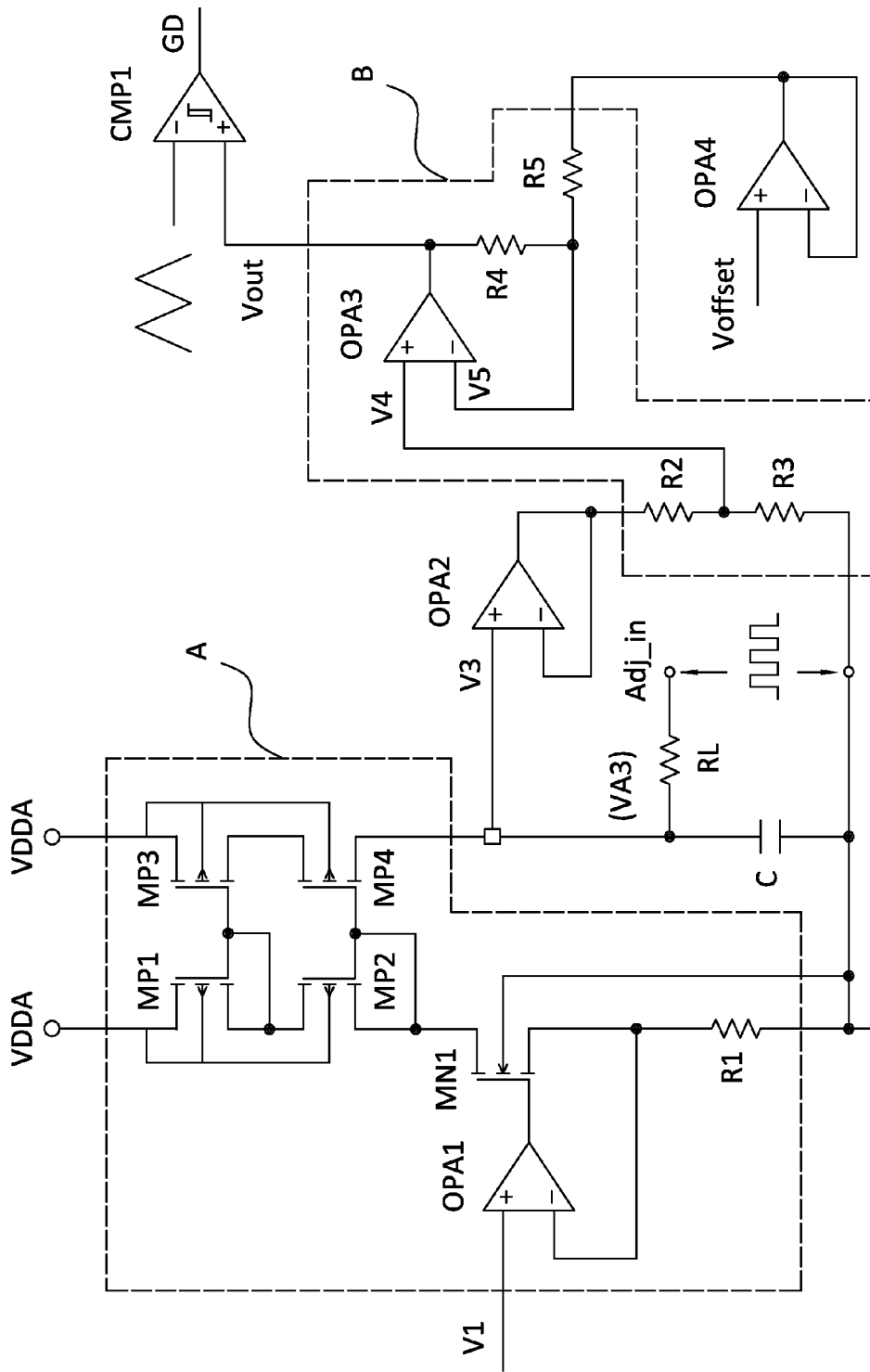
FIG. 8 is a main circuit diagram of the offset voltage eliminating circuit in accordance with the present invention connected with a traditional PWM-type dimmer.

Referring to FIG. 8, when the embodiment of the present invention is connected with a traditional PWM-type dimmer, the output Pout is grounded through a capacitor C. The current-limiting resistor RL and the capacitor C form a RC oscillating circuit, such that the PWM signal creates an effective DC voltage VA3 on the output Pout through the discharging of the capacitor C. When the circuit is conducting, a current flows through the current-limiting resistor RL to create a voltage across the current-limiting resistor VL3. This voltage VL3 is the offset voltage.

Similarly, if the non-inverting input of the fourth operational amplifier OPA4 is input with an offset reference voltage Voffset that is equal to the voltage of the current-limiting resistor VL1 in magnitude, then the offset voltage (that is, the voltage of the current-limiting resistor VL3) can be eliminated, such that the final output voltage Vout will be equal to the dimming signal voltage VA3 input by the dimming signal input ADJ_in. Thereafter, the output voltage Vout can be input the hysteresis comparator CMP1. The hysteresis comparator CMP1 compares the output voltage Vout with the saw-tooth wave to output a GD pulse for adjusting the brightness of the LED.

In view of the above, the offset voltage eliminating circuit structure for a protection mechanism of a dimmer in accordance with the present invention achieves the effect of effectively removing the voltage difference (offset) created by an external current-limiting resistor, and is thus submitted to be novel and non-obvious. A patent application is hereby filed in accordance with the patent law. It should be noted that the descriptions given above are merely descriptions of preferred embodiments of the present invention, various changes, modifications, variations or equivalents can be made to the invention without departing from the scope or spirit of the invention. It is intended that all such changes, modifications and variations fall within the scope of the following appended claims and their equivalents.

What is claimed is:

1. An offset voltage eliminating circuit structure for a protection mechanism of a dimmer, comprising:
    a constant current source including an output for outputting a stable current, the output connected with a dimming signal input through a current-limiting resistor, the dimming signal input connected with an output of an external traditional dimmer;
    a subtractor formed by a third operational amplifier and second, third, fourth and fifth resistors that have the same resistances, the second and the third resistors connected in series, and the non-inverting input of the third operational amplifier connected between the second and the third resistors R2 and R3, the other end of the second resistor connected with the output, and the other end of the third resistor connected to ground, the fourth and the fifth resistors connected in series, and the inverting input of the third operational amplifier connected between the fourth and the fifth resistors, the other end of the fourth resistor connected between the output and the inverting input of the third operational amplifier, and the other end of the fifth resistor being input with an offset reference voltage; and
    a hysteresis comparator including a non-inverting input, an inverting input and an output capable of outputting a GD pulse signal, the non-inverting input connected to the output of the third operational amplifier, and the inverting input being input with a saw-tooth wave.

2. The offset voltage eliminating circuit structure as claimed in claim 1, wherein constant current source is formed of two symmetric sets of P-type transistors with two transistors connected in series in each set, wherein one set of the P-type transistors is further connected with an N-type transistor to form a cascaded current mirror circuit, and the N-type transistor is further connected with an operational amplifier and a resistor, the non-inverting input of the operational amplifier is grounded through the resistor, and the other set of P-type transistors is connected to an output.

3. The offset voltage eliminating circuit structure as claimed in claim 1, wherein one end of the fifth resistor away from the fourth resistor is connected to a fourth operational amplifier, the non-inverting input of the fourth operational amplifier is input with the offset reference voltage, and the output and the inverting input of the fourth operational amplifier are both connected to the fifth resistor.

4. The offset voltage eliminating circuit structure as claimed in claim 1, wherein a second operational amplifier is provided between the output of the constant current source and the second resistor of the subtractor, the non-inverting input of the second operational amplifier is connected with the output of the constant current source, and the inverting input of the second operational amplifier is connected with both the output of the second operational amplifier and the second resistor.

* * * * *